March 8, 1966     E. V. BUNTING ET AL     3,239,012
HYDRAULIC POWER UNIT AND CONTROL SYSTEM FOR TRACTORS
Filed Aug. 26, 1960     9 Sheets-Sheet 1

INVENTORS.
ERNEST V. BUNTING &
DONALD J. KIESGEN
BY
Wolfe, Hubbard, Voit & Osann
ATTORNEYS.

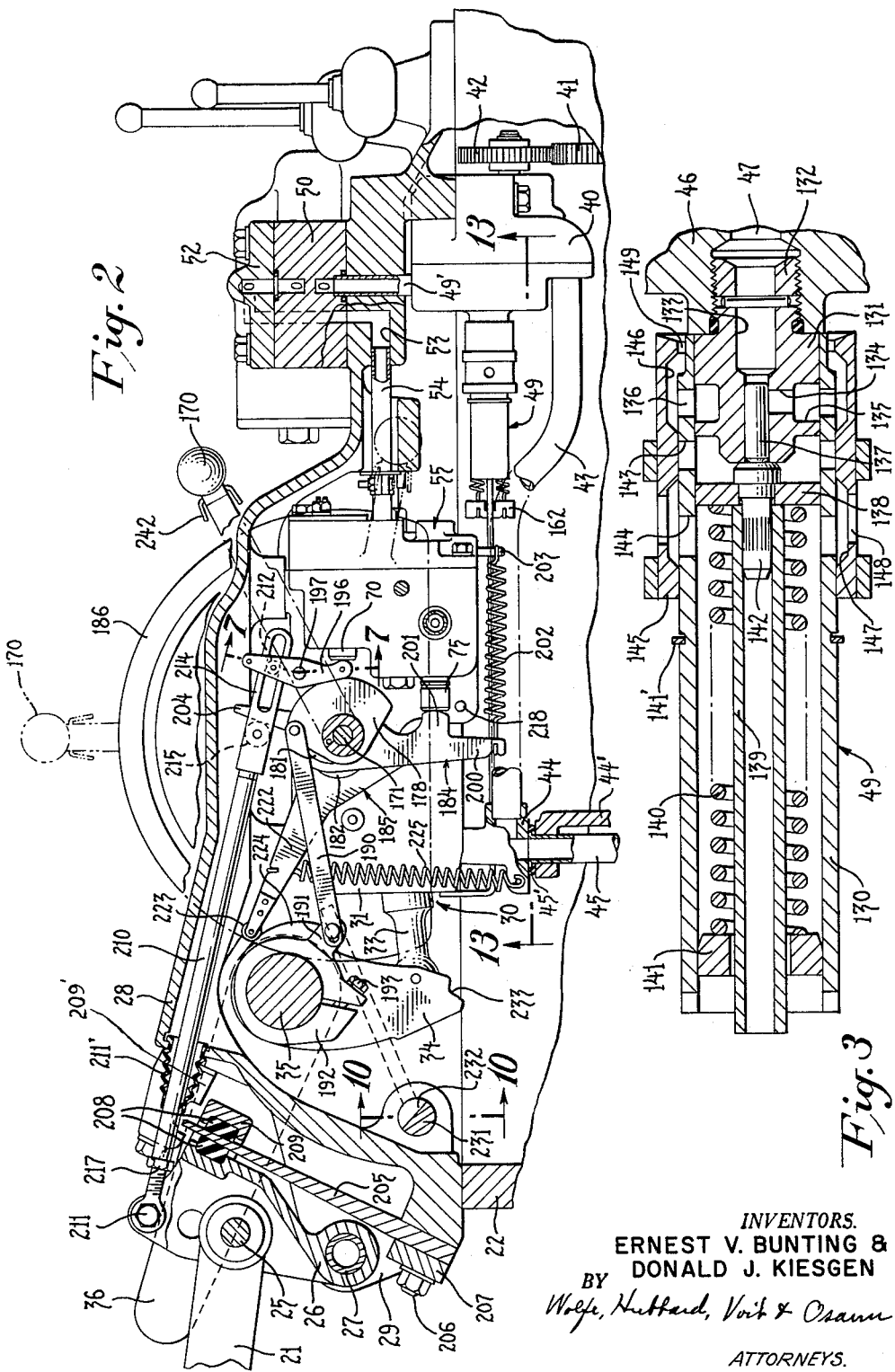

INVENTORS.
ERNEST V. BUNTING &
DONALD J. KIESGEN
BY Wolfe, Hubbard, Voit & Osann
ATTORNEYS.

March 8, 1966 E. V. BUNTING ET AL 3,239,012
HYDRAULIC POWER UNIT AND CONTROL SYSTEM FOR TRACTORS
Filed Aug. 26, 1960 9 Sheets-Sheet 4

INVENTORS.
ERNEST V. BUNTING &
DONALD J. KIESGEN
BY
*Woefe, Hubbard, Voit & Osann*

ATTORNEYS.

March 8, 1966 E. V. BUNTING ET AL 3,239,012
HYDRAULIC POWER UNIT AND CONTROL SYSTEM FOR TRACTORS
Filed Aug. 26, 1960 9 Sheets-Sheet 6

INVENTORS.
ERNEST V. BUNTING &
BY DONALD J. KIESGEN

ATTORNEYS.

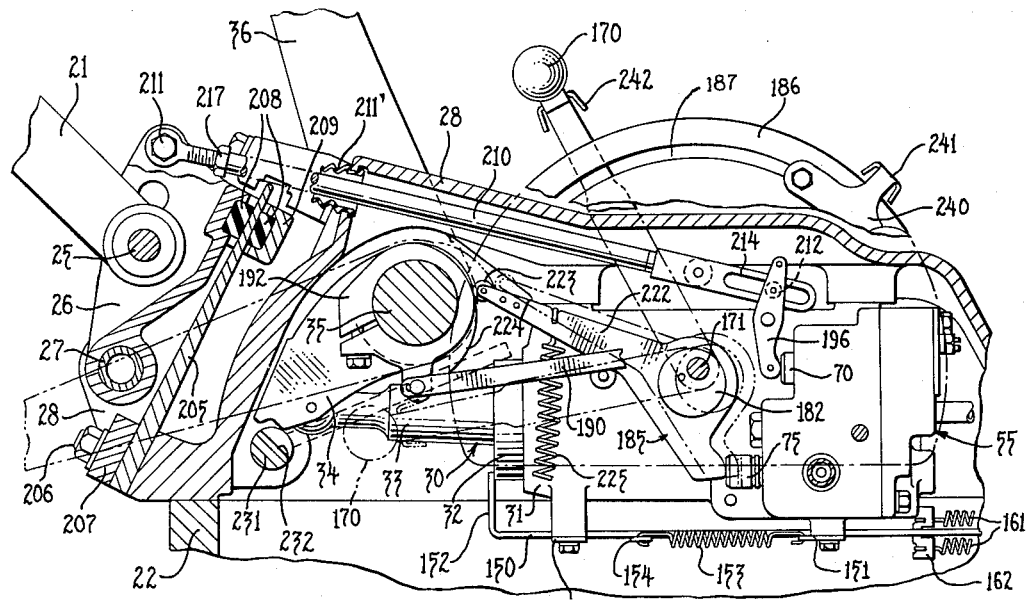

INVENTORS.
ERNEST V. BUNTING &
DONALD J. KIESGEN
BY Wolfe, Hubbard, Voit & Osann
ATTORNEYS.

United States Patent Office 3,239,012
Patented Mar. 8, 1966

3,239,012
HYDRAULIC POWER UNIT AND CONTROL
SYSTEM FOR TRACTORS
Ernest V. Bunting, Detroit, and Donald J. Kiesgen, Dearborn, Mich., assignors to Massey-Ferguson Inc., Racine, Wis., a corporation of Maryland
Filed Aug. 26, 1960, Ser. No. 52,114
9 Claims. (Cl. 172—9)

The invention relates to tractors of the type equipped with a power elevatable implement hitch linkage and it is more particularly concerned with an improved hydraulically operated power unit and control system for such tractors.

One object of the invention is to provide a hydraulic power unit and control system for tractors of the above general type particularly characterized by its versatility and adaptability and additionally by its simplicity and low cost of production.

Another object is to provide a control system including improved means for automatically unloading the power unit supply pump when the hitch linkage is raised to transport position. An ancillary object is to provide pump unloading controls so constructed and arranged that the system is conditioned instantly for full operation in either automatic draft or position control as soon as the hitch linkage is lowered from transport position.

Still another object is to provide a hydraulic system for tractors affording either automatic draft control, position control or auxiliary actuator control selectively without interference between the different types of control.

Another object is to provide a hydraulic system in which the hydraulic fluid may be circulated selectively in either of two paths, one of which includes a cooling radiator for dissipating the heat and keeping the oil at a relatively low safe temperature and in which selection of the circulating path is effected automatically in accordance with the temperature of the oil.

Still another object is to provide an improved spring arrangement for balancing the tension and compression forces imposed on the tractor through the hitch linkage.

It is also an object of the invention to provide an improved valve for hydraulic systems of the above general character capable of functioning either as a pressure relief valve or as a pump unloading valve. A related object is to provide improved control means for conditioning a combination relief and unloading valve for the particular type of operation required by the system.

Other objects and advantages of the invention will become apparent from the following detailed description of the preferred embodiment illustrated in the accompanying drawings, in which FIGURE 1 is a side elevation view of a tractor equipped with a hydraulic system embodying the features of the invention, the drive wheel on the near side of the tractor being omitted to show details of the hitch linkage and related parts.

FIG. 2 is a fragmentary sectional view through the center housing and cover plate of the tractor taken in a vertical plane substantially on the center line of the tractor showing details of the hydraulic system and controls, the latter being positioned for automatic draft control.

FIG. 3 is a longitudinal sectional view through the combined pressure relief and pump unloading valve constituting an element of the hydraulic system.

FIG. 11 is a fragmentary sectional view similar to FIG. 2 showing the controls set for position control.

FIG. 12 is a fragmentary sectional view similar to FIGS. 2 and 11, showing the control range for auxiliary actuators.

While a single preferred embodiment of the invention has been shown and will be described herein, this is not intended to limit the invention to the particular form illustrated, the intention being to cover all modifications, adaptations, and alternative constructions falling within the spirit and scope of the invention as more broadly or generally characterized in the appended claims.

GENERAL

Figure 1:
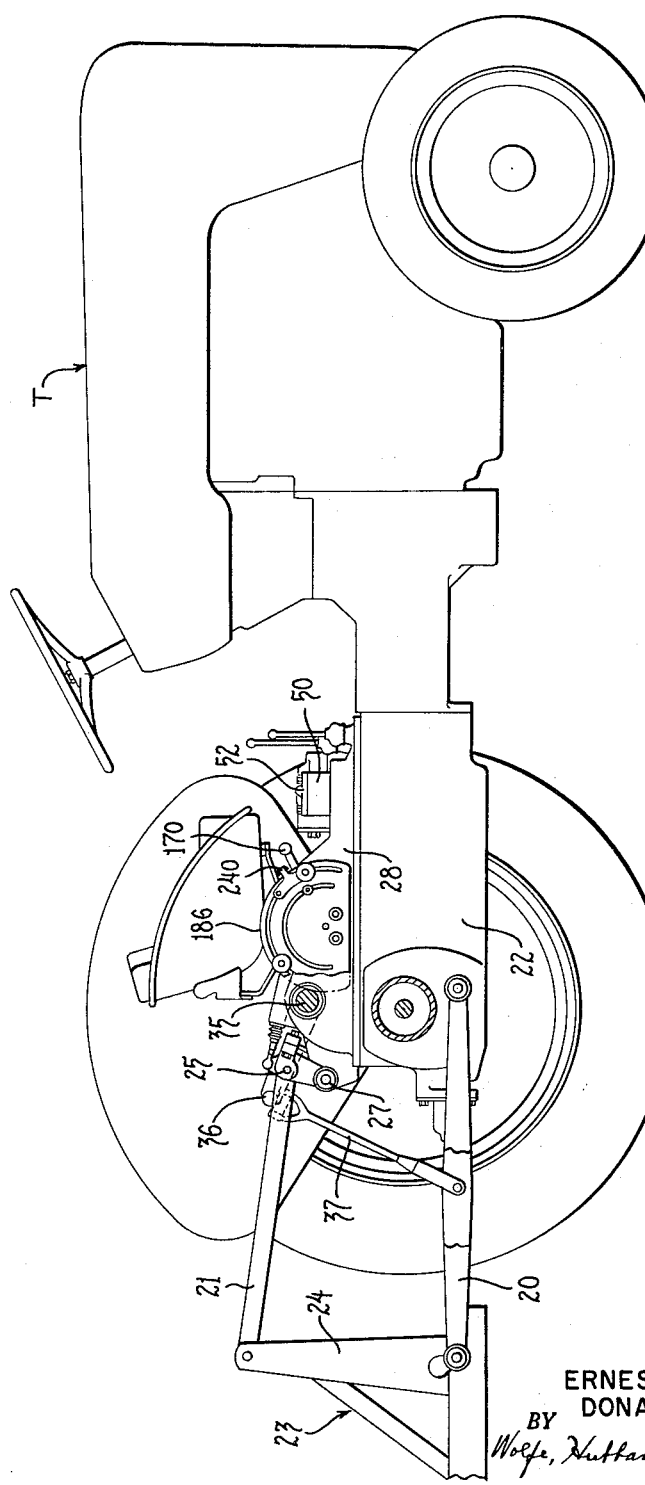

For purposes of illustration the invention has been shown as incorporated in a tractor T having a trailing, three-element implement hitch linkage including a pair of laterally spaced lower or draft links 20 and a top or control link 21 as shown in FIG. 1. The draft links are universally pivoted at their forward ends on the tractor center housing 22 and are swingable vertically for raising and lowering an implement 23 connected in the conventional manner to the trailing ends of the respective links. A top link 21 is pivoted at its aft end to an upright strut 24 on the implement, thus locating the point of connection substantially above the draft link connection. At its forward end the top link is pivotally connected as by a pin 25 (FIGS. 2, 11 and 12) to a rocker 26 which in turn is pivotally supported as by a tubular pivot shaft 27 on a cover plate 28 closing the upper end of the tractor center housing 22. As shown in FIG. 2, the pivot shaft 27 is recessed in alined apertures in a pair of spaced flanges 29 integral with the cover plate and extending rearwardly therefrom. Preferably the rocker is formed with a plurality of holes for the top link pivot pin 25 differently spaced from the rocker pivot to provide readily available means for adjusting the leverage ratio between the implement and the draft responsive means. The rocker is spring loaded to resist tension and compression forces transmitted from the implement through the top link 21 and thus constitutes a part of the draft responsive means as will be described in detail later on.

POWER UNIT

Figure 8:
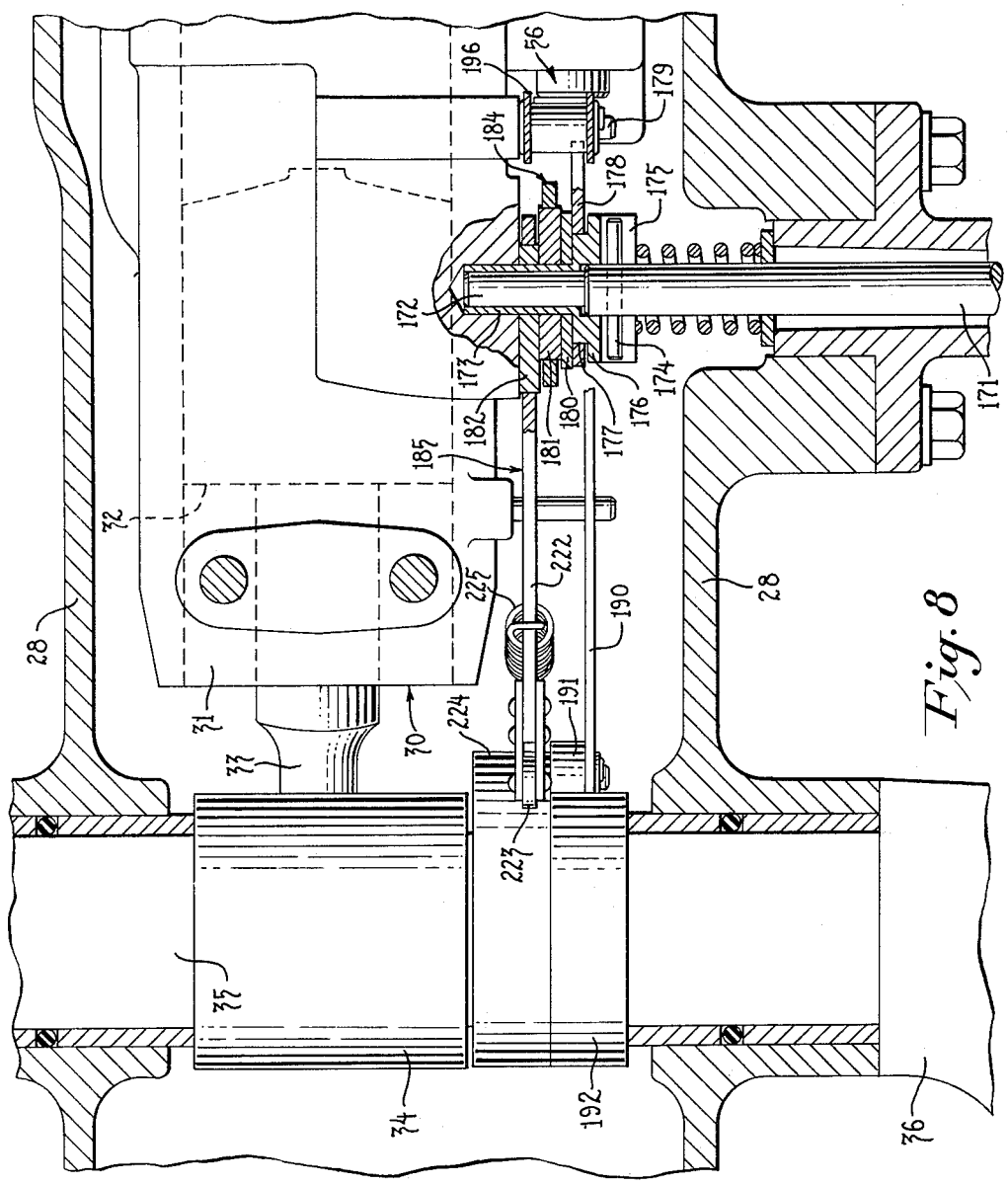
FIG. 8 is a fragmentary sectional view through the center housing cover plate taken in a horizontal plane substantially on the line 8—8 of FIG. 4.

Raising and lowering of the draft links 20 and attached implement is effected by a power unit 30 (FIGS. 2, 4, 8, 12–13 and 17) of the hydraulically operated type. The power unit of the exemplary tractor comprises a hydraulic ram having a cylinder 31 bolted or otherwise rigidly secured to the underside of the cover plate within the center housing. The cylinder is mounted with its open end facing rearwardly and is fitted with a working piston 32 (FIGS. 8, 11–13, and 16) operatively connected by a piston rod 33 with a crank arm 34 rigidly fixed on a cross shaft 35 journaled in the center housing cover plate 28 as shown in FIG. 8.

The cross shaft 35 which constitutes the lift shaft of the power unit projects at opposite sides of the cover plate and each end is fitted with a crank or lift arm 36 (FIGS. 1, 2, 11 and 12) connected by a drop link 37 with the adjacent draft link 20. The arrangement is such that when pressure fluid is supplied to the closed end of the cylinder 31, the piston 32 is driven rearwardly to rock the lift shaft clockwise and thus swing the draft links 20 and attached implement upwardly. When fluid is permitted to escape from the cylinder, the load imposed on the hitch linkage forces the piston rearwardly and the linkage and implement attached thereto descend.

Pressure fluid for operating the power unit 30 is supplied by a pump 40 (FIGS. 2 and 17) adapted, in this instance, to be driven continuously from the tractor engine through a drive train including intermeshing gears 41 and 42. The particular pump shown is a gear pump and it is preferably mounted on the underside of the cover plate 28 forwardly of the power unit. Its intake is connected to draw fluid such as oil from a sump or reservoir provided in the lower portion of the center housing 22, the connection including intake conduit 43, elbow fitting 44 and drop pipe 45. The latter is supported in the tractor housing as by a bracket 44' in a position such that the pipe and fitting register properly when the power assembly is mounted on the tractor as explained hereinafter. A gasket 45' interposed between the bracket and the fitting provides a liquid tight seal for the intake. It will be understood, of course, that the drop pipe is fitted with a screen or filter for intercepting metal chips or other large particles entrained in the oil stored in the sump.

Figure 17:
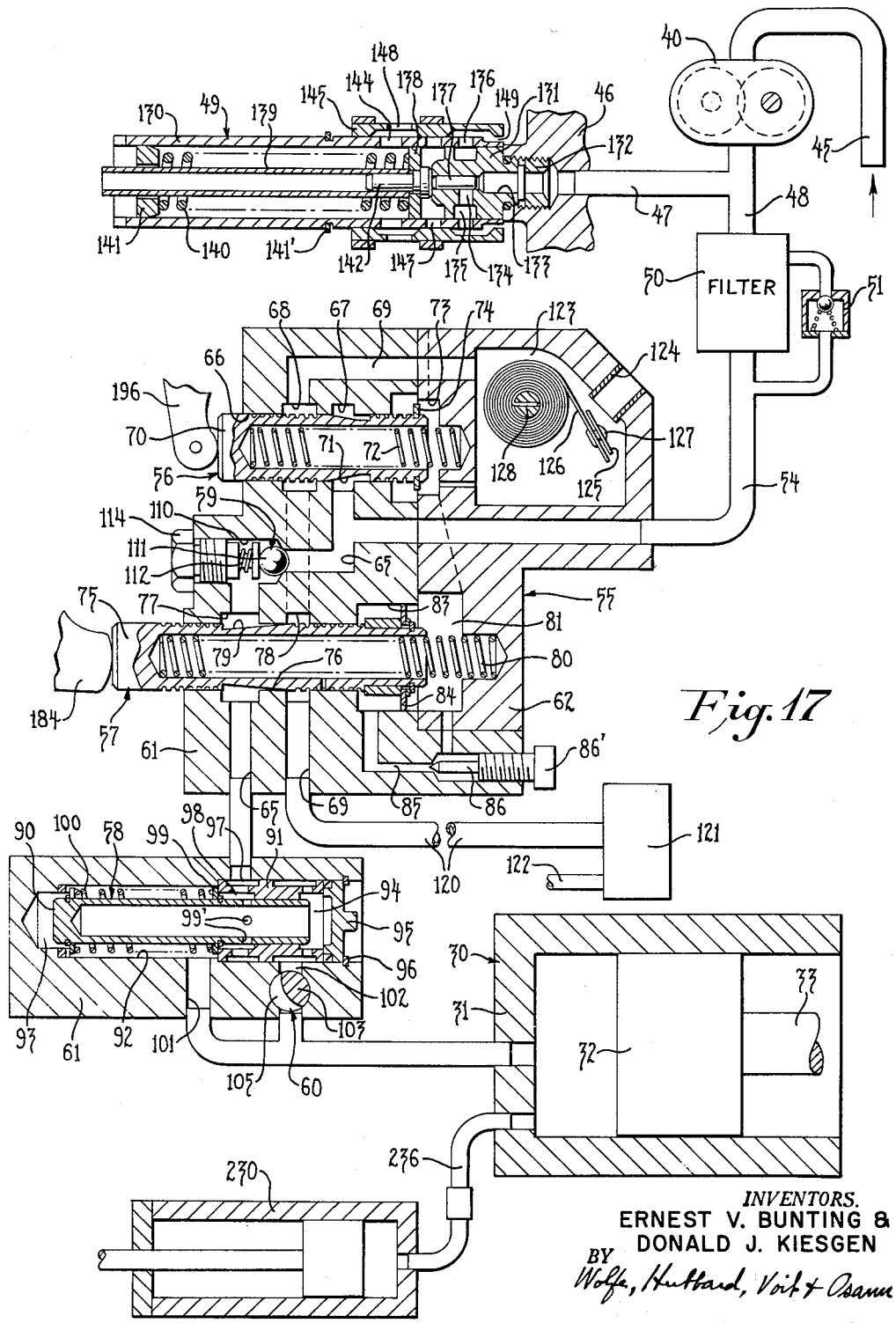
FIG. 17 is a partly diagrammatic partly sectioned view of the tractor hydraulic system including the main and auxiliary power units and the associated control valve assembly.

The pump delivers fluid under pressure into a passage in the pump body 46, the passage dividing into two branches 47 and 48 as shown diagrammatically in FIG. 17. One of the branch passages, in this instance, the passage 47, is equipped with suitable valve means for relieving the pressure in the system when required. While this valve may be of the conventional type, I have shown here a combined pressure relief and unloading valve 49 described in detail hereinafter. The other branch 48 of the passage is connected by a vertical outlet tube 49' (FIG. 2) with a filter 50 which, in this instance, is mounted on a paid formed on the upper surface of the cover plate 28. The outlet tube 49' is O-ring sealed at both ends to permit convenient attachment and removal of the filter.

The filter may be of any preferred type operative to remove all solid material from the circulating fluid which is preferably oil. In the exemplary embodiment a relief valve 51 is provided in the filter casing and connected to provide a by-pass around the filter in case it should become clogged. The filter has an outlet opening in the upper face of its casing for cooperation with a conventional transfer cap 52 which has machined passages operative to establish a flow path from the filter to a machined passage 53 in the cover plate 28. The latter passage is connected by an O-ring sealed conduit 54 with a control valve assembly 55.

CONTROL VALVE ASSEMBLY

The control valve assembly 55 comprises a simple, compact unit housing the various valves required for the complete control of the power unit. The construction of the valve assembly and the relationship of the valves to each other and to the components of the hydraulic system will be readily seen by reference to FIGS. 4, 5, 6 and 17 of the drawings. Briefly, the assembly includes a by-pass valve 56, a main control valve 57 and a flow control valve 58. Cooperating with the major valves is a check valve 59 and an orifice valve 60. The valves are all housed in a casing comprising a body 61 which may be formed integral with or mounted on one side of the ram cylinder 31. An end plate 62 bolted to the body completes the casing.

Figure 4:
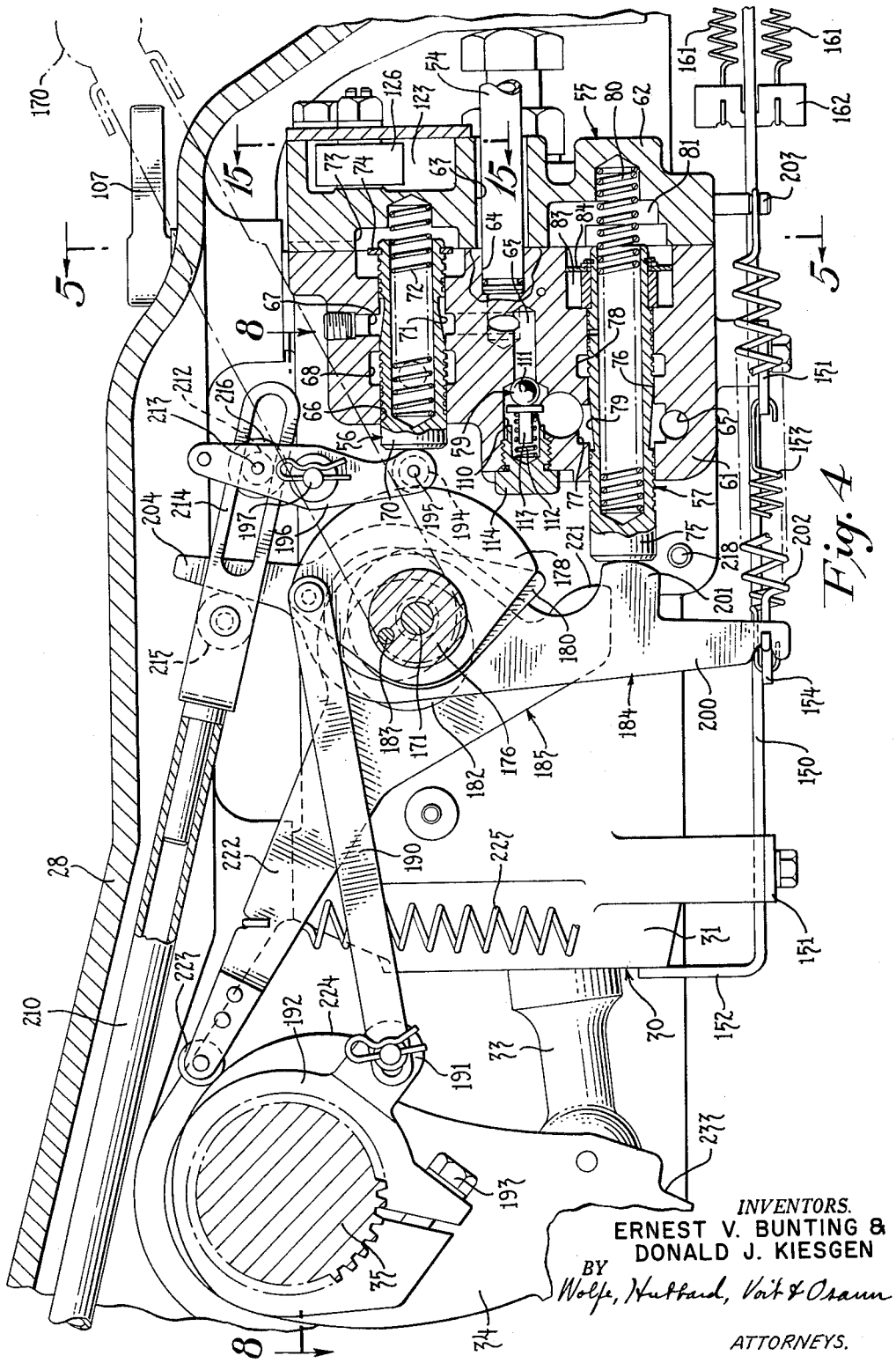
FIG. 4 is a fragmentary sectional view through the control valve assembly and associated valve actuating mechanism.

As shown in FIG. 4, the pressure fluid delivery conduit 54 extends through an opening 63 in the end plate and is O-ring sealed in a port 64 in the valve body. Port 64 opens to a passage 65 in the valve body which communicates both with the by-pass valve 56 and the main valve 57. To accommodate the by-pass valve the body has a bore 66 circumferentially grooved to provide two axially spaced annular chambers 67 and 68. Pressure supply passage 65 opens to the chamber 67 while chamber 68 is in communication with an exhaust passage 69 of which more will be said later.

A plunger 70 slidable axially in the bore 66 controls communication between the chambers 67 and 68. For this purpose the plunger is formed with a circumferential groove 71 of a width sufficient to span the chambers 67 and 68 when the plunger is shifted to the open position or to the left from the position in which is is shown in FIGS. 4 and 17. When in such position the pressure fluid supplied by the pump 40 is diverted to the exhaust passage 69 and pressure in the system is reduced to a relatively low level. In the position shown, the plunger interrupts communication between the chambers 67 and 68 and fluid at full pump pressure is delivered to the main valve 57. Preferably, the groove 71 is tapered to permit a gradual opening or closing of the by-pass and thus permit precisely controlled metering of the fluid flow to exhaust.

Valve plunger 70 is yieldably biased toward the open position by a compression spring 72. To accommodate a spring having the desired characteristics and still maintain the valve assembly in compact form, the inner end of the plunger is formed with a deep bore in which the major portion of the spring is housed. The other end of the spring seats in a socket formed in the end wall of a chamber 73 into which the plunger projects, the chamber being vented to exhaust by suitable passages formed in the valve body and cover plate. A snap ring 74 fixed to the end of the plunger limits plunger movement in the opening direction.

The main control valve 57 includes a plunger 75 slidable axially in a bore 76 in the valve body. Grooves in the bore walls define a pair of axially spaced chambers 77 and 78. Plunger 75 controls communication between those chambers by means of a circumferential groove 79 which is wide enough to span the two chambers when the plunger is shifted to the "lowering" position or to the right from the "raise" position in which it is shown in FIGS. 4 and 17. In the "raise" position, the plunger effectively interrupts communication between the chambers and the groove 79 is tapered to permit precise metering of fluid flow between the chambers in intermediate positions of the plunger.

Valve chamber 77 opens to the pressure supply passage 65 while chamber 78 is open to the exhaust passage 69. It will be apparent therefore that the plunger 75 is operative either to allow fluid at full pump pressure to flow to the control valve 58 and power unit 30 or to divert the fluid supply to exhaust and to simultaneously permit exhaust of fluid from the unit.

The plunger 75 is yieldably biased toward the "raise" position by a spring 80 housed in a bore in the inner end of the plunger and seating in a recess in the end wall of a chamber 81 into which the plunger projects. As will be seen by reference to FIG. 5 of the drawings, chamber 81 is in effect an extension of the chamber 73. Both chambers are vented to the exhaust side of the system in a manner such that they are filled with oil at all times.

To insure smooth movement of the valve plunger 75 either by the spring 80 or by the control elements acting against the spring, provision is made for damping plunger movements in both directions. For this purpose the valve body is formed with a counterbore concentric with the valve bore 76 and defining the cylinder 83 for the reception of a piston element 84 mounted on the end of the plunger. Both ends of the cylinder are connected together and to the vented chamber 81 by a passage 85 (FIG. 17) in which is interposed an adjustable needle valve 86 operative to control the rate of fluid flow into or out of the cylinder. The piston element 84 is dimensioned with regard to the spring pressure exerted on the plunger so that movements of the latter in either direction are effectively damped even though the forward movement is restrained by atmospheric pressure. A fingerpiece 86' is provided on the projecting end of the needle valve for effecting the necessary adjustments.

Figure 6:
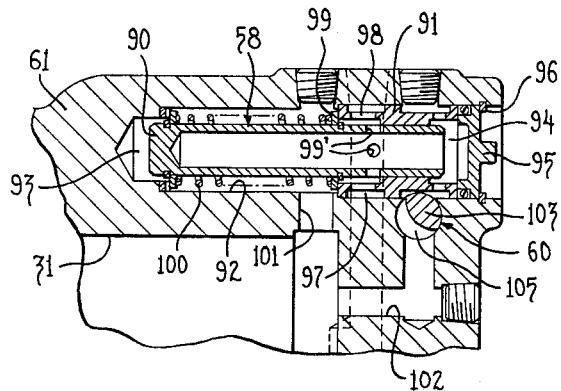
FIG. 6 is a fragmentary sectional view taken in off-set planes substantially on the line 6—6 of FIG. 5.

As shown in FIGS. 6 and 17, flow control valve 58 is interposed between the control valve 57 and the power unit 30 in controlling relation to the orifice valve 60. More particularly, valve 58 is constructed and arranged to permit substantially unrestricted fluid flow to the actuator cylinder 31 while controlling exhaust of fluid from the cylinder by regulating the pressure drop across the orifice valve 60.

As herein shown, the valve 58 comprises a plunger 90 slidable in a sleeve 91 fitted in a bore 92 in the valve body 61 and dividing the bore into chambers 93 and 94. The bore 92 is closed at both ends, the closure at one end being effected by a removable plug 95 retained in place by a snap ring 96. Passage 65 leading from the control valve 57 opens into an annular external channel 97 in the sleeve 91 which channel, in turn, opens through radial ports into an enlarged interior section of the sleeve which, with the plunger 90 forms an annular chamber 98.

Fluid flow from the chamber 98 into the chamber 93 in the valve body is controlled by a valve element 99 in the form of a ring slidable on the plunger 90 and urged against the end of the sleeve by a compression spring 100 interposed between that ring and a stop ring adapted to abut the shoulder adjacent the end of the valve bore 92. The rings are restrained against movement toward the adjacent ends of the plunger by snap rings, thereby enabling the spring 100 to bias the valve plunger toward the position in which it is shown in FIG. 17 in addition to urging the valve ring 99 to closed position.

Valve plunger 90 is formed with an axial bore opening through the end which projects into the chamber 94. Radial ports 99' in the plunger open to the chamber 98 and, in the normal position of the plunger provide a flow passage between the chambers. Valve chamber 93 is connected by a short passage 101 in the valve body 61 with the closed end of the power unit cylinder as shown in FIG. 6. Valve chamber 94 is also connected to the closed end of the cylinder by a passage 102 in which the orifice valve 60 is interposed.

Figure 5:
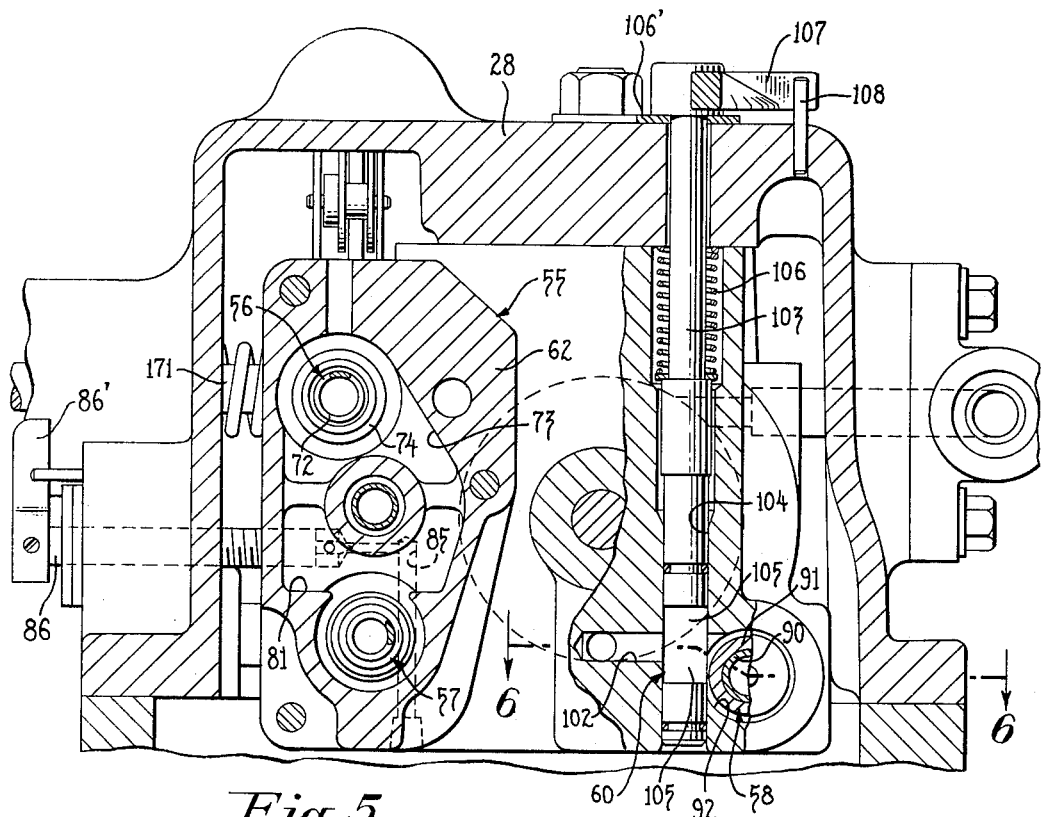
FIG. 5 is a fragmentary transverse sectional view through the control valve assembly taken in a vertical plane substantially on the line 5—5 of FIG. 4.

As shown in FIG. 5, the orifice valve comprises an elongated cylindrical stem 103 rotatable in a vertical bore 104 in the valve body which intersects the passage 102. The portion of the stem registering with the passage has one side cut away as at 105 whereby the effective area of the passage or, in other words, the orifice defined by the valve may be varied or closed completely by rotation of the stem. A compression spring 106 interposed between opposed shoulders on the stem and the valve body serves to locate the stem in the bore and provide a means for loading a friction and sealing element 106' interposed between the cover plate 28 and a head fixed to the end of the stem which is extended to project through a hole in the plate. A fingerpiece 107 extending radially from the head affords convenient means for manually rotating the stem to adjust the size of the orifice. The limit position of the valve is defined by a stop pin 108 fixed to the cover plate and extending into the path of the fingerpiece.

The mode of operation of the valve 58 will be readily apparent. When the control valve 57 is shifted to the "raised" position pressure fluid delivered through the passage 65 will force the valve ring 99 to the open position and fluid will flow to the actuator cylinder 31 with little restriction. A portion of the fluid delivered through the passage 65 will also reach the cylinder by way of the ports 99', chamber 94, orifice valve 60 and passage 102.

When the control valve 57 is shifted to the "lowering" position, passage 65 is connected to exhaust and consequently fluid is forced from the cylinder 31 by the load imposed on the actuator through the hitch linkage. The pressure of the fluid in the cylinder will now be exerted on the plunger 90 and valve ring 99 in a direction to close the passage through the chamber 98 and consequently discharge of fluid will take place through the passage 102, orifice 60 and ports 99'.

Due to the flow restricting action of the orifice, the pressure in the chamber 94 will tend to fall below the pressure in the chamber 93 which is connected to receive the full cylinder pressure. This pressure differential acts to shift the plunger 90 to the right against the bias of the spring 100, thus partially closing the ports 99' and restricting flow from the chamber 94 until the opposing pressures on the ends of the plunger are precisely balanced.

It will be evident that the valve 58 is operative to restrict the exhaust of fluid from the actuator cylinder 31 to a predetermined rate regardless of the pressure developed in the cylinder by the load imposed on it through the hitch linkage. The rate can be varied, of course, by adjustment of the orifice 60. The net result, however, is that the valve 58 is effective to restrict the lowering of the hitch linkage and attached implement to a controlled desired rate regardless of the weight of the implement or the load imposed on it in a lowering direction.

It will be observed that the check valve 59 is interposed in the pressure supply passage 65 between the valve 57 and the by-pass valve 56. The check valve is thus effective to prevent exhaust of fluid from the cylinder 31 through the by-pass valve when the latter is opened to unload the pump. To accommodate the check valve, the passage 65 has an enlarged section 110 defining a valve seat against which a valve member in the form of a ball 111 is yieldably urged by a spring 112. In the particular valve shown the spring is carried by a guide 113 having a shank slidable in a recess in a plug 114 threaded into the enlarged section of the passage. A head on the shank provides an abutment for the spring and bears against the ball in a direction effective to close the passage against the fluid flow toward the by-pass valve.

When the valve assembly above described is operated in draft control, balancing of the load on the power unit will involve a constant metering of oil through the control valve 57. Such metering results in energy loss which is expended as heat. The invention provides means whereby the exhaust oil may be diverted through a radiator or other cooler when the heat generated raises the oil temperature to a predetermined level. At temperatures below such level the oil is returned directly to the sump.

For accomplishing the above result, the exhaust passage 69 in the valve body is connected at one end by a conduit 120 (FIG. 17) to a cooler 121 which may be of any preferred type. Fluid passing through the cooler is returned to the sump by way of a conduit 122. The other end of the passage 69 is extended to open into a chamber 123 (FIGS. 4, 5 and 17) formed in the end plate 62 of the valve assembly. Chamber 123 opens directly to the sump by way of an exhaust port which in this instance is fitted with a bushing 124. The inner end of the bushing 124 defines a seat for a valve member 125 herein shown as a disc of suitable material adapted to be moved into or out of engagement with the bushing.

As shown in FIG. 17, the valve member 125 is carried by a thermally responsive member herein shown as a bimetal strip 126. The valve member is secured as by a rivet 127 to one end of the strip which is coiled around and has its other end anchored to a pin 128 adjustably secured in the end plate and having one end projecting into the chamber 123. The strip 126 is positioned so that it is effective to retract the valve member from the exhaust port when the temperature of the oil in the chamber 123 is below a predetermined level.

As the exhaust port affords much less resistance to fluid flow than the longer path through the cooler, substantially all fluid exhausted through the valve assembly will be returned directly to the sump when the valve member 125 is in the open position. When the temperature of the fluid rises during operation of the hydraulic unit, thermostatic strip 126 swings the valve member toward bushing 124 and, upon rise in temperature to a predetermined level, the valve member completely closes the exhaust port. The temperature at which this occurs may be adjusted by appropriate rotation of the pin 128, the outer end of which is slotted for accommodation of a screwdriver or other tool for effecting such adjustment. Upon closure of the exhaust port, all fluid delivered to the exhaust passage 69 will be diverted through the cooler 121 to dissipate heat before return of the fluid to the sump for reuse.

Before turning to the controls for actuating the valves of the assembly 55, it will be helpful to consider the construction and mode of operation of the combination relief and unloading valve 49. As indicated before, this valve may be replaced by a conventional pressure relief valve if desired. It is not included in the assembly in the particular embodiment illustrated but is preferably mounted directly on the body of the pump 40 and in communication with the pump outlet through the passage 47 as shown in FIGS. 2, 3, 13 and 17. Referring particularly to FIG. 3, the valve comprises an elongated tubular casing 130 having a cylindrical plug 131 pressed or otherwise rigidly secured in one end. The plug has a reduced end portion 132 threaded externally for engagement in an internally threaded port in the pump body terminating the passage 47. A stepped bore 133 extends axially through the plug and a radial port 134 opens from the smaller diameter section of the bore to an annular chamber 135 formed by a circumferential groove in the plug. Chamber 135 registers with a series of outlet ports 136 formed in the wall of the casing 130.

Slidable in the small diameter section of the bore 133 is a valve member 137 yieldably biased to a position to close the port 134 until the pressure exerted on its inner end raises to a predetermined value. The biasing means as herein shown comprises a piston element 138 having a sliding fit in the casing 130 and guided for reciprocation therein by a tubular stem 139. A coiled compression spring 140 encircling the stem is interposed between the piston element and a stop member 141 fixed in the casing 130 adjacent its outer end. The stop member is centrally apertured to afford clearance for the stem 139. In the particular embodiment illustrated the piston element 138 is centrally apertured to accommodate a headed pin 142 adapted to bear against the adjacent end of the valve member 137.

In practice the stop member 141 is pressed into the casing as a step in the assembly operation. The position of the member determines the force exerted on the spring 140 and accordingly the valve may be preset at the factory to open and relieve the pressure in the system at a predetermined level and this setting cannot be altered either inadvertently or intentionally in the field.

To enable the valve to function as an unloading valve the casing 130 is pierced by two series of ports 143 and 144 spaced apart axially so as to lie on opposite sides of the piston element 138 when the latter is in the valve closing position in which it is shown in FIG. 3. Conditioning of the valve selectively for relief or unloading is effected by a valve member in the form of a sleeve 145 slidable axially of the casing. The sleeve has two axially spaced internal grooves 146 and 147 separated by a land dimensioned for a sealing fit with the outer surface of the casing. The groove 147 is vented through a series of ports 148 in the sleeve.

When the valve 49 is required to operate as a pressure relief valve, the sleeve 145 is shifted to its forward position, that is, toward the right end of the casing as shown in FIG. 3. In that position, the groove 146 extends over the ports 136 and the reduced end of the valve casing to define a relatively large exhaust port 149 for any fluid discharged through the valve port 134. Such discharge occurs, of course, only when the pressure acting on the inner end of the valve member 137 reaches the level at which the valve has been set to open by the initial positioning of the stop or abutment 141.

By way of example, the valve may be set to open when the pressure in the bore 133 rises to 1700 p.s.i. It will be appreciated that the valve member 137 will be forced back sufficiently to open the port 134 wide enough to bleed off as much fluid as necessary to prevent the pressure in the system from rising substantially above the set level. When the pressure in the system falls below the set level, the spring 140 shifts the valve member forwardly to close the port 134 and the hydraulic system is conditioned for normal operation.

When the sleeve 145 is shifted to its rearward position, that is, to the left against the stop defined by a snap ring 141' seated in a groove in the casing 130, the valve 49 is conditioned to operate as a pump unloading valve. More particularly, the valve is conditioned to open when the system pressure rises to the level set for relief and to provide sufficient venting area to reduce the system pressure to and maintain it at a relatively low level as, for example, 100 p.s.i. At this low pressure little power is wasted in driving the pump and heating and aerating of the fluid is reduced to a minimum.

The positioning of the sleeve as above described conditions the valve for unloading action by closing the port 149 and establishing communication between the exhaust port 134 and the space between the plug 131 and the piston element 138. Such communication is established by way of the groove 146 which spans the ports 144 and 143 in the valve casing. Fluid entering the space at full pump pressure forces the piston element 138 rearwardly against the force exerted by the spring until the piston element uncovers the ports 144 and provides an exhaust path for the escape of fluid. Pressure in the system is thus reduced to the level at which the force exerted on the relatively large effective area of the piston element balances the force exerted by the spring 140. In practice, the parts may be dimensioned to attain that balance at approximately 100 p.s.i. or comparable pressure level.

In accordance with one aspect of the invention provision is made for automatically conditioning the valve 49 for a selected mode of operation in accordance with the position of the hitch linkage. In the particular embodiment illustrated, the arrangement is such that the valve is conditioned to act as a pressure relief valve and protect the system against excessive pressure when the hitch linkage is in any position other than its upper limit or transport position. Upon movement of the linkage to transport position the valve is automatically conditioned to act as an unloading valve. It is thus effective to unload the pump in case the primary valve 57 which normally performs that function should become stuck or otherwise fail to act.

Figure 13:
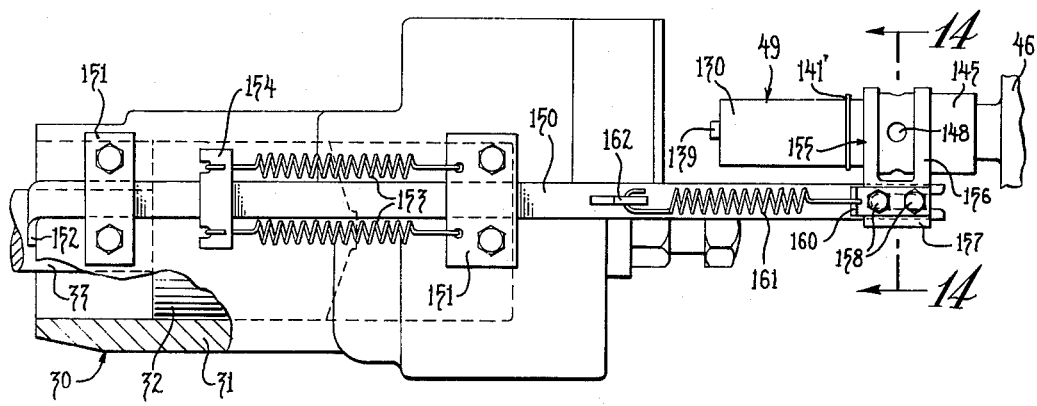
FIG. 13 is a fragmentary view of the underside of the power unit and control valve assembly taken in a horizontal plane substantially on the line 13—13 of FIG. 2.

The valve conditioning mechanism in its preferred form as shown in FIGS. 4 and 11–13 comprises an elongated bar 150 supported by brackets 151 below the power unit cylinder 31 to slide axially of the cylinder. At its rear end the bar 150 is formed with a tailpiece 152 bent upwardly at right angles and dimensioned to extend over the open end of the cylinder 31. Spring means herein shown as a pair of tension springs 153 connected between the forward bracket 151 and a cross piece 154 fixed to the bar 150 urge the latter forwardly and hold the tailpiece against the cylinder. As the hitch linkage is raised to transport position, piston 32 emerges from the cylinder and by engaging the tailpiece 152 as shown in FIGS. 12 and 13, shifts the bar 150 rearwardly.

Figure 14:
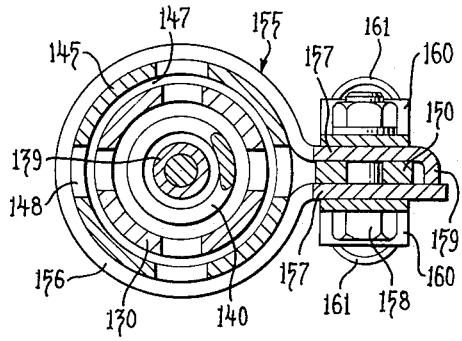
FIG. 14 is a transverse sectional view through the combined relief and pump unloading valve taken in a plane substantially on the line 14—14 of FIG. 13.
Figure 16:
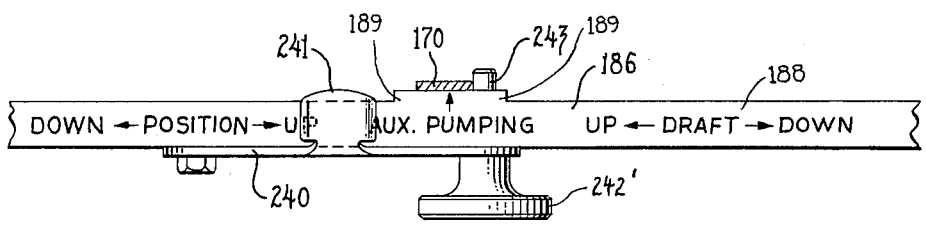
FIG. 16 is a fragmentary plan view of the indicia bearing rim of the control quadrant.

At its forward end the bar 150 is operably connected with the valve sleeve 145 by means including a clamp 155 (FIGS. 13 and 14). The clamp includes a cylindrical band 156 adapted to encircle the sleeve and terminating in a pair of laterally extending legs 157 secured together by bolts 158 and retained in spaced parallel relation by a flange 159 formed on one of the legs and engaging the other leg. As shown in FIG. 13, the central section of the band 156 is cut away to expose the exhaust ports 148 in the sleeve.

Preferably the connection between the bar 150 and the clamp 155 is a yieldable one to insure against damage to any of the parts in case the sleeve 145 should stick. For this purpose the end portion of the bar 150 is slotted so as to straddle the bolts 158 when inserted between the legs 157. Angle members 160 secured to the legs 157 by the bolts 158 provide anchorages for a pair of springs 161 which have their ends hooked to a cross piece 162 (FIG. 4) entered in a slot in the bar 150. The arrangement is such that the valve sleeve, clamp and coupling elements normally follow the fore-and-aft movements of the bar 150. If the sleeve should stick or if anything interferes with its rearward movement, the springs 161 yield and allow the bar to move relative to the sleeve and thereby prevent damage to the structure.

CONTROL MECHANISM

Control mechanism is provided for actuating the valves of the assembly 55 to provide what is generally known as automatic draft control and also what is known as position control. Both types of control are concerned with the positioning of the hitch linkage and the implement attached to it. In automatic draft control, draft responsive means operating in conjunction with manually settable controls operates to maintain the implement at a working depth effective to maintain a selected, substantially constant draft load on the tractor. The draft load is the force resulting from the reaction of the ground against the implement as the latter is drawn forwardly by the tractor. Accordingly, in the case of soil working implements such as plows, maintenance of a constant draft load results in keeping the implement at a more or less uniform working depth assuming, of course, that soil conditions are substantially uniform.

In position control, position responsive means acts in conjunction with manually settable means to regulate the position of the hitch linkage and attached implement relative to the tractor. The instant invention also provides for the control of an auxiliary hydraulic actuator with the hitch linkage usually locked in an inactive position as, for example, in the transport position.

MANUAL CONTROLLER

Figure 15:
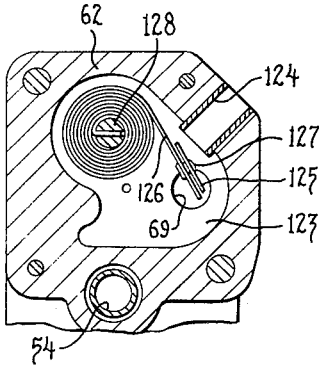
FIG. 15 is a fragmentary sectional view through the valve assembly housing, taken in a plane substantially on the line 15—15 of FIG. 4.

In the exemplary control mechanism, selection of the particular type of control for operation and regulation of the action of the selected control mechanism is effected by a single, manually operable element herein shown as a hand lever 170 (FIGS. 1, 2, 4, 11 and 12) mounted to swing alongside a stationarily supported quadrant and commonly known in the art as a quadrant lever. The quadrant 186 is formed with an arcuate slot 187 for mounting adjustable stops or the like. Its upper edge portion is flanged over to define a rim 188 stamped or otherwise provided with suitable indicia as shown in FIG. 15 for guiding the tractor driver in operating the hydraulic system. This hand lever is fixed to the projecting end of a horizontally disposed shaft 171 rotatably supported in the tractor cover plate 28 and extending into the center housing at the rear of the valve assembly 55 as shown in FIGS. 2 and 4. The inner end portion 172 of the shaft is reduced in diameter to slidably receive a sleeve member 173 having a disengageable driving connection with the shaft. Such connection is provided in the present instance by a cross pin 174 inserted through a hole in the shaft and seating in a transverse slot 175 formed in an enlarged head 176 (FIG. 9) integral with the sleeve.

Figure 9:
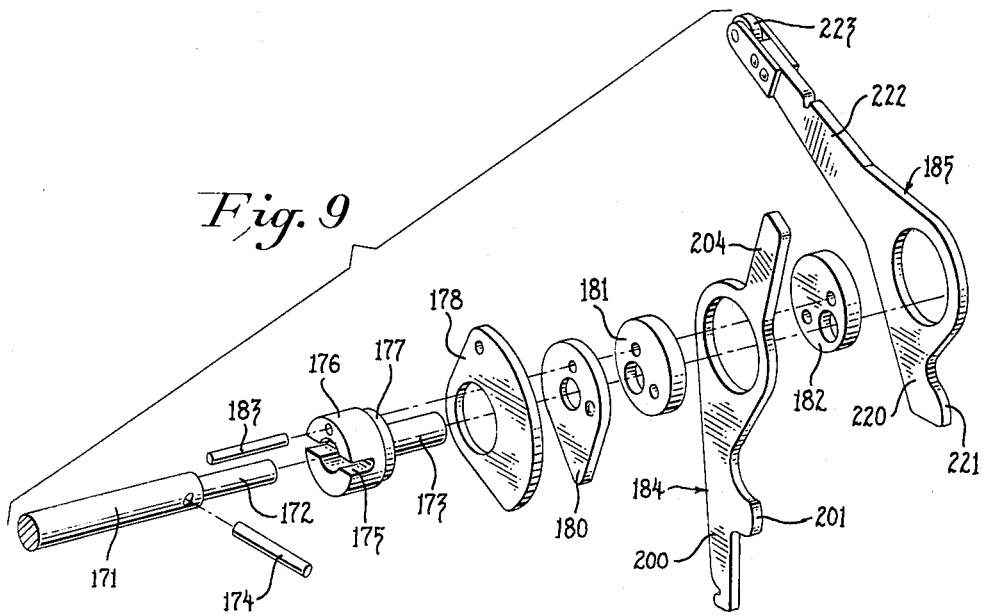
FIG. 9 is an exploded perspective view of an assembly of elements of the valve actuating mechanism for the different types of control afforded by the exemplary control system.

Referring to FIGS. 8 and 9, the enlarged portion 176 of the sleeve is formed with a cylindrical shoulder 177 defining a bearing concentric with the axis of the shaft 171 for rotatably supporting a cam 178 to be described hereinafter. Mounted on the sleeve 173 in face-to-face relation are a valve actuating cam 180 and a pair of eccentric bearing discs 181 and 182, all drivingly coupled to the sleeve by a pin 183 extending through alined holes in those parts and in the head 176. Disc 181 provides a bearing eccentric to the axis of the shaft 171 for a bell crank lever 184 while disc 182 provides a similar eccentric bearing for a bell crank lever 185.

It will be observed on reference to FIGS. 8 and 9 that the discs 181 and 182 are oriented differently relative to the shaft 171, in this instance, with the axes of the bearings offset relative to each other somewhat more than 90°. By reason of this offset, either of the bell crank levers 184 and 185 may be moved bodily toward the valve assembly or into operative relation with the control valve 57 while the other bell crank lever is moved away from that valve or to an inactive position. In other words, selection between the levers 184 and 185 is determined by the angular positioning of the shaft 171, such selection determining whether the system is to operate in draft control or in position control.

The cam 180 is fixed to the shaft in a position such that its tip portion is moved into operative relation to the by-pass valve 56 when both bell crank levers 184 and 185 are in their inactive positions, it acts in conjunction with the control of an auxiliary actuator, as will appear presently.

Referring more particularly to FIGS. 2, 11 and 12, the eccentrics 181 and 182 are positioned so that the bell crank lever 184 is moved forwardly for cooperation with the valve plunger 75 as the control lever 170 is swung through a forward range between the limit position in which it is shown respectively in broken and solid lines in FIG. 2. This is the draft control range. As the hand lever is swung forwardly, the fulcrum defined by the disc 181 is shifted toward the valve assembly to condition the draft responsive means for cooperating with the hand lever in determining the position of the hitch linkage and attached implement. For present purposes it is sufficient to note that as the hand lever is swung forwardly and downwardly the hitch linkage is lowered to bring the implement into engagement with the ground and thereafter the draft responsive means takes charge to maintain the linkage at a level determined by the extent of movement of the hand lever from its upper limit position. Return of the hand lever 170 to its upper limit position, that is, the position shown in broken lines in FIG. 2, results in raising the linkage to the transport position. Throughout the above range of hand lever movement the bell crank 185 is retracted from the valve assembly and thus rendered ineffective to exercise control.

The hand lever 170 is also swingable through a second range or rearwardly and downwardly between the positions shown in full and broken lines in FIG. 11.

This is the position control range. The full line position represents the upper limit or transport position of the linkage while the broken line position represents the fully lowered position of the linkage. In this range the bearing disc 182 shifts the fulcrum of the bell crank 185 toward the valve assembly and conditions it for actuating the main control valve 75. The companion bell crank lever 184 is simultaneously shifted rearwardly and rendered ineffective for control purpose.

As shown in FIG. 12, the upper limit positions of the hand lever 170 in draft control and position control ranges indicated in broken lines do not coincide but are spaced apart by an angle of approximately 27°. Those positions may be designated for convenient location by the tractor's driver as by shoulders 189 formed on the quadrant rim 188 along which the hand lever swings. The space between those two shoulders plus a small part of the position control sector represents the range of movement of the hand lever for the control of auxiliary actuators.

PUMP UNLOADING

Before taking up the action of the hydraulic system under different types of control, consideration of the novel arrangement provided by the invention for loading and unloading the pressure fluid source or pump for the hydraulic system will be helpful. It may be noted that the arrangement shown eliminates the objectionable operating characteristics of prior systems which require lowering of the implement to the ground to reset the unloading mechanism after each unloading of the system. More specifically, the unloading mechanism of the present invention permits the system to be reloaded without requiring the linkage to be relieved of the weight imposed upon it by the implement. Moreover, the reloading may be effected with the tractor in motion regardless of whether the system is to operate in draft or position control.

In accordance with the invention, provision is made for unloading the hydraulic system by opening the by-pass valve 56 as the hitch linkage is raised to transport position and before the pressure in the system can build up sufficiently to operate the combined safety relief and unloading valve 49. Valve 56 when opened diverts the output of the pump 40 back to the sump at relatively low pressure as before explained.

In its preferred form the unloading mechanism includes the cam 178 which, as described above, is mounted for rotation about the axis of the control shaft 71. The cam is rotated in synchronism with the lift shaft 35 by a driving connection including a link 190 pivotally connected to a boss 191 projecting radially from a sleeve 192 rigidly mounted on the lift shaft as shown in FIGS. 2, 4, 11 and 12. In the particular embodiment illustrated the sleeve is frictionally clamped to the shaft, being slit for that purpose and having its ends drawn together as by a screw 193.

Figure 7:
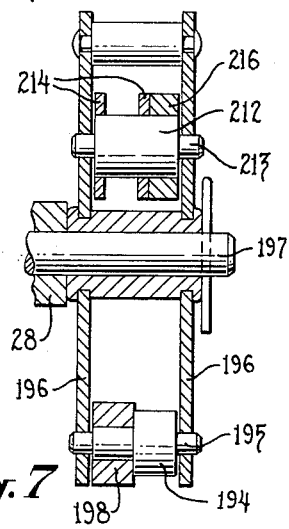
FIG. 7 is a fragmentary sectional view taken in intersecting planes substantially on the line 7—7 of FIG. 2 showing a detail of the valve actuating mechanism.

For opening and closing the valve 56, the edge of the cam engages a follower roller 194 journalled on a shaft 195 carried at the lower end of a lever 196 pivotally supported by a pin 197 on the center housing cover plate 28. A second and somewhat larger roller 198 (FIG. 7) journalled on the shaft 195 bears directly against the valve plunger 70. The edge of the cam 178 is given a somewhat spiral shape with respect to the rotational axis of the cam so that the valve plunger is not only shifted to and held in the closed position whenever the hitch linkage is lowered even a slight amount from the transport position but is moved in and out slightly to prevent sticking. As the hitch linkage moves upwardly and approaches transport position and just before the crank arm 34 is stopped by engagement with the cover plate (see FIG. 11), the end of the cam passes beyond the follower roller and allows the valve plunger to move instantly to the open position under the influence of its spring 72.

It will be evident from the above that with the hitch linkage in transport position and the control lever 170 in either transport notch, the pump output is by-passed to the sump through the valve 56 and the unloading valve remains closed. Movement of the hand lever 170 in a lowering direction from either transport position initiates the lowering of the hitch linkage by opening the valve 57. Cam 178 immediately closes the by-pass valve 56 but valve 57 being open, diverts at least a portion of the pump delivery and insures that pressure in the system does not build up sufficiently to operate the valve 49. Thus, full control of the system for either type of control is instantly available.

AUTOMATIC DRAFT CONTROL

As indicated above, the hydraulic system is conditioned for automatic draft control when the quadrant lever 170 is swung through its forward range or toward the position shown in full lines in FIG. 2. The clockwise rocking of the shaft 171 and the eccentric disc 181 carries the axis of the bell crank lever 184 forwardly toward the control valve assembly and conditions the lever for actuating the main control valve 57. As shown in FIGS. 2 and 9, lever 184 has an enlarged central portion apertured for a bearing fit over the disc 181 about which it is rotatable. One arm 200 depends from the central portion of the lever and is formed with a forwardly projecting lug 201 positioned to engage the valve plunger 75 of the control valve when the lever is shifted to its active position. A coiled tension spring 202 connected between an anchoring stud 203 and the notched lower end of the lever urges the latter in a direction to shift the valve plunger toward a lowering position against the force exerted on the plunger by its associated spring 80. Spring 202 is substantially more powerful than spring 80 and consequently the lever 184 is biased in a direction to actuate the control valve to the lowering position when the quadrant lever 170 is initially swung forwardly in the draft control range.

The descent of the hitch linkage and implement begins as soon as the power unit cylinder 31 is vented by the control valve 57 and the descent continues until the ground reaction or draft load imposed on the linkage by the implement approaches the value for which the quadrant lever has been set. At that point the draft responsive mechanism assumes control and through the medium of the upwardly projecting arm 204 of the bell crank lever 184 rocks it in a direction to establish a balance between the draft load and the force applied by the power unit cylinder 31. More particularly, the valve plunger 75 of the control valve is permitted to move rearwardly under the action of its spring 80 and partially close the passages through which pressure fluid from the pump and from the power unit cylinder has been flowing to the sump. The extent of such closure is determined by the draft load in conjunction with the initial setting of the quadrant lever and is just sufficient to balance the lifting action of the power unit against the downward acting load imposed by the implement.

Movements of the plunger 75 are effected smoothly and evenly regardless of how the operating pressures are applied. This is due to the dashpot action of the piston element 84 reciprocating in the cylinder 83. Sudden application of pressure may withdraw the lever 184 from contact with the plunger but the piston element restrains the plunger which follows only gradually. Similarly, upon sudden withdrawal of control pressure from the top link, plunger 75 will be restricted to relatively slow, smooth movement by the action of the spring 202. Such damped movements of the valve plunger effectively prevent chattering or lunging of the implement and contribute substantially to the maintenance of the implement precisely at the selected working depth.

While conventional draft responsive means may be utilized for the operation of the control valve, the invention provides improved means for that purpose. This includes a main control spring 205 of the leaf type, cantilever mounted and operatively connected with the rocker 26. To provide optimum performance, the spring is constructed substantially in the form of a proportional beam to enable it to provide maximum deflection and minimum stress with a nearly constant rate. As shown in FIG. 2 the control spring is operatively connected to the pivoted rocker 26 in a manner which enables it to resist swinging of the rocker in either direction by the forces transmitted to it through the top link 21 of the hitch linkage.

In the particular embodiment illustrated, spring 205 comprises an elongated bar of spring steel having one relatively thick end portion and tapering gradually towards its opposite end. The thicker end of the spring is rigidly clamped to the housing cover plate 28 by bolts 206 extending through a clamping plate 207. The anchorage point of the spring is thus located immediately below the rocker pivot shaft 27. As shown in FIG. 2, the spring 205 extends along the front face of the rocker and is floatingly clamped thereto between a pair of resilient blocks 208 of rubber or the like seated in pockets formed in opposed abutments on the rocker member and in an extension 209 thereof. It will be apparent that the spring may be deflected by either tension or compression forces applied to the rocker through the top link 21. Adjustment of the range of deflection may be effected by the insertion of a shim or shims between the spring and the cover plate or by removal of the shims. A block 209' fixed to the rear of the cover plate provides stops on opposite sides of the spring to define its limit position when deflected in either tension or compression.

Movements of the rocker 26 are transmitted to the draft control bell crank lever 184 through the medium of an adjustable control tube 210 pivotally secured as at 211 to the rocker and extending forwardly into the tractor center housing through an opening in the cover plate 28. A flexible boot 211' fitted over the tube and in the aperture prevents entrance of dirt or other foreign substances to the interior of the center housing. The control tube is supported and guided at its forward end for fore-and-aft movement by a roller 212 rotatably supported on a shaft 213 carried by the lever 196. As will be seen by reference to FIG. 7, roller 212 engages in alined slots in the legs of a bifurcated member 214 fixed to the inner end of the tube 210 as shown in FIG. 4. Preferably the tube is attached to the member 214 so that it may be rotated to adjust its effective length by screwing it in or out relative to the fitting by which it is connected to the rocker. A lock nut 217 threaded on the fitting retains the parts in adjusted positions.

Member 214 is positioned to straddle the arm 204 of bell crank lever 184 and carries an abutment in the form of a roller 215 in position to engage the lever arm when the rod is urged forwardly by a compressive force applied through the top link 21. A spacer 216 (FIG. 7), in this instance, mounted on the roller 212 carried by the lever 196 holds the member 214 in the proper position relative to the lever 196. Upon forward movement of the tube 210 through application of tension or reduction of pressure on the rocker, bell crank lever 184 is rocked anticlockwise by the spring 202 to maintain the arm 204 in engagement with the roller 215. In case such movement of the rod is too rapid, lever 184 follows slowly due to the dashpot action on the valve plunger 75.

POSITION CONTROL

As indicated above, swinging of the hand lever 170 through the position control range, that is, rearwardly from the full line position shown in FIG. 11 moves the bell crank lever 185 to operative position. Bell crank lever 184 at the same time is moved rearwardly and downwardly to the inactive position in which it is supported by a pin 218 (FIG. 4) which is positioned to be engaged by the lug 201 in the retracted position of the lever. As shown in FIG. 9, this bell crank lever has an enlarged intermediate portion apertured to fit over the bearing disc 182. An arm 220 depending from the intermediate portion of the lever presents a rounded, forwardly projecting nose 221 in position to engage the end of the control valve plunger 75 when the bell crank lever is in operative position.

A second arm 222 of the lever 185 extends upwardly and rearwardly from the intermediate portion of the lever and carries a follower roller 223 adapted to ride on an edge cam 224 fixed to the lift shaft as shown in FIGS. 2, 4, 8, 11 and 12. A tension spring 225 acting between a stud anchored to a stationary part of the power unit such as the fitting 44 and the intermediate portion of the arm 222 urges the lever in a direction to hold the follower roller against the cam.

As shown in FIG. 4, the cam 224 is shaped to enable it to cooperate with the quadrant lever 170 in operating the bell crank lever 185 so as to effect a follow-up action which positions the hitch linkage in correspondence with the position of the quadrant lever in its position control range. Thus, when the hitch linkage and the quadrant lever are in the transport position as shown in FIG. 11, swinging of the quadrant lever rearwardly shifts the axis of the lever 185 forwardly into active position. The lever in turn shifts valve plunger 75 toward the lowering position, venting the power unit cylinder 31 to exhaust. The hitch linkage accordingly descends with the lift shaft rotating anticlockwise as viewed in FIG. 11.

Cam 224 rotates with the lift shaft and imparts a clockwise movement to the lever 185, swinging its lower end outwardly relative to the control valve plunger 75 which advances under the urging of its spring 80. Descent of the links and outward movement of the valve plunger continue until a hydraulic balance is attained effective to sustain the hitch linkage and attached implement in a position relative to the tractor corresponding to the position of the quadrant lever in its position control range. If the position of the quadrant lever is changed, the control valve 57 is operated to initiate appropriate follow-up movement of the linkage which maintains its position corresponding to that of the quadrant lever through the entire range of movement of the latter.

AUXILIARY ACTUATOR CONTROL

In accordance with still another aspect of the invention, an auxiliary actuator 230 connected in the hydraulic system as shown in FIG. 17 may be controlled by movements of the quadrant lever 170 in its intermediate range. That range is between the upper limit or transport positions of the draft and position control ranges, respectively, shown in broken lines in FIG. 12. As explained heretofore, with the quadrant lever in either transport position, the lift shaft is rocked clockwise until the rear face of the crank arm 34 is stopped just short of engagement with the cover plate housing as shown in FIG. 12.

Figure 10:
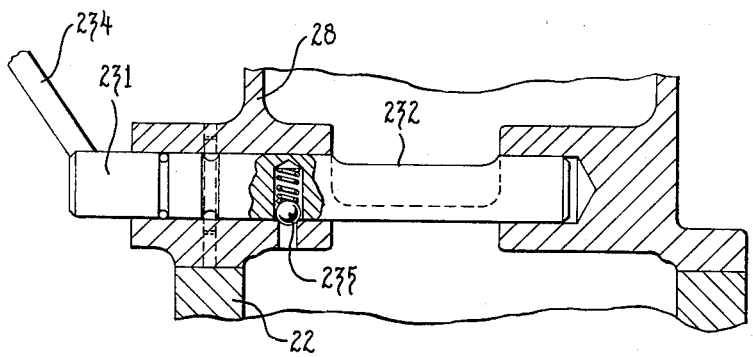
FIG. 10 is a fragmentary sectional view taken in a plane substantially on the line 10—10 of FIG. 2 showing details of the mechanism for locking the power lift mechanism in transport position.

To permit use of the auxiliary actuator, provision is made for mechanically locking the lift shaft in the transport position. For this purpose a locking pin 231 is supported for rotation in the cover plate 28 in position to cooperate with the free end of the crank arm 34. (FIGS. 2 and 10.) The pin is cut away at one side intermediate its ends as at 232 to afford clearance for the passage of the crank arm when the pin is in the normal position in which it is shown in FIGS. 2 and 11. When rocked to operated or locking position, the solid portion of the pin in back of the cut-away portion is interposed in the path of the crank arm as shown in FIG. 12. The crank arm and with it the lift shaft and the hitch linkage are thus positively locked in the elevated or transport position. To facilitate the engagement between the pin and the crank arm, the tip portion of the latter may be notched as at 233.

Suitable means such as a fingerpiece 234 is provided for manually rotating the pin 231 between the normal and locking positions. A detent in the form of a spring pressed ball 235 (FIG. 10) cooperates with an appropriately located indentation in the cover plate to releasably retain the pin in unlatched position.

Referring now to FIG. 17, it will be observed that the auxiliary actuator 230 is a one-way ram having the closed end of its cylinder detachably connected by a conduit 236 with the power unit cylinder 31. Piston 32 of the power unit is restrained against movement by the locking of the lift shaft as above described. Accordingly, actuation of the control valve to direct pressure fluid to or exhaust pressure fluid from the cylinder 31 will affect only the auxiliary actuator.

It will be recalled that the raising of the hitch linkage to transport position turns the cams 178 to open the by-pass valve 56 and unload the pump. Thus, with the linkage in transport position, there is ordinarily no pressure fluid available for operating the auxiliary actuator. With the quadrant lever in either transport position bell crank levers 184 and 185 are retracted from the main control valve 57 and the biasing spring of that valve therefore maintains the valve plunger 75 in the raise position in which it is shown in FIG. 17. In this position of the plunger, pressure supply passage 65 is connected through the power unit cylinder 31 to the auxiliary actuator but without effect as the fluid supply is by-passed to the sump by the valve 56. The exhaust of fluid from the auxiliary actuator through the above described passage is blocked by the check valve 59.

When it is desired to operate the auxiliary actuator in a raising direction, quadrant lever 170 is swung toward the center of its intermediate range; that is, to the position in which it is shown in full lines in FIG. 12. Movement of the quadrant lever rocks the shaft 171 and the cam 180 to bring the high point on the cam into engagement with the lever carried roller 198 and move the latter in a direction to shift the by-pass valve plunger 70 inwardly and close the by-pass. Pressure in the system builds up rapidly and fluid is supplied via the path described for the ram cylinder 31 and through that cylinder to the auxiliary actuator.

To facilitate location of the valve closing position, the quadrant 186 may be equipped with a small sector 240 adjustable along the slot 187 in the quadrant. As shown in FIG. 12, the sector is formed with an upstanding knob 241 adapted to lie directly below a complemental element 242 integrated with the quadrant lever. After being set in a position such that the upstanding knob shrouds the position control shoulder 189 the sector is locked to the quadrant by means of a clamp screw 242'. A pin 243 carried by the screw extends into the path of the lever 170 and serves to define the correct lift position.

To cut off fluid flow to the auxiliary actuator the quadrant lever is simply returned to the transport position located by upstanding knob 241 which opens the by-pass valve 56 and terminates the flow of fluid to the actuator. In the event that the return of the quadrant lever is delayed the auxiliary actuator may complete its working stroke after which pressure in the system will increase sufficiently to open the combined relief and pump unloading valve 49. The pump will thus be unloaded as previously described.

The eventual return of the quadrant lever to transport position will open the by-pass valve 56 and the resultant pressure drop will permit the valve 49 to reset so that normal operation and control of the power unit is instantly available.

To operate the auxiliary actuator in a lowering direction the quadrant lever 170 is advanced beyond the transport position in the position control range. Such advance acts through the lever 185 to shift the main control valve plunger to the lower position in which it vents the auxiliary actuator by opening the valve 75 to the sump. Lowering of the hitch linkage is prevented by the locking pin 231 which only needs to be rotated to its inactive position to condition the hydraulic system for resumption of normal operations.

UNITARY ASSEMBLY

It will be noted that the hydraulic power unit including the hydraulic actuator 30, the pump 40 and lift shaft 35, as well as all of the controls, are mounted on the tractor housing cover plate 28 and with it constitute a complete, operative unit. The various components can therefore be assembled and tested on the bench, which greatly facilitates the assembly operation. Moreover, units can be quickly and easily interchanged when required so that a tractor need only be kept out of service a very short time in case repair or replacement of parts is necessary.

Assembly of the unit with the tractor is a simple matter. It merely involves the placement of the cover plate 28 over the opening in the center housing with the gears 41, 42 in meshing engagement. It will be understood that a suitable gasket will be interposed between the cover plate and the housing to prevent leakage of oil. As the cover plate is dropped in place, the fitting 44 automatically registers with the gasketed intake pipe 45. Connection of the top link 21 of the hitch linkage completes the assembly and the tractor is ready to operate.

RESUME

While the construction and mode of operation of the hydraulic system and controls will be readily apparent from the foregoing, it will be hopeful to review briefly the operating procedures involved for different types of control. Starting with the quadrant lever 170 in either of its transport positions and with the hitch linkage fully raised, the system may be placed in automatic draft control by simply swinging the quadrant lever in a forward direction, for example, from the position shown in broken lines in FIG. 2 toward the position shown in full lines. The extent of displacement of the lever from the transport position determines the draft to be maintained on the hitch linkage and therefore, to a degree, the depth at which the attached implement is to operate in the soil.

Forward swinging of the quadrant lever shifts the fulcrum of the draft control lever 184 forwardly to bring the latter into operative relation to the plunger 75 of the main control valve. The force exerted on the bell crank lever by the spring 202 swings the lower end of the lever inwardly as far as permitted by dashpot piston washer 84, thereby shifting the valve plunger to the lowering position. Such movements of the bell crank lever result since the control tube 210 will be maintained in a retracted position by reason of the tension imposed on the top link of the hitch linkage due to the rearward tilt of the implement.

The opening of the main control valve 57 vents the power unit cylinder to exhaust and permits the linkage and attached implement to descend. As the descent begins, cam 178 is rocked to a position to close the by-pass valve 56 and thereby reload the pump. However, pressure fluid supplied at this time is by-passed by the main control valve 57 to the sump at relatively low pressure so that the combined relief and unloading valve 49 remains unoperated.

As the implement descends to ground level and starts to dig in, ground reaction tends to rock it in a direction to apply a compressive force through the top link 21, or, in the case of extremely heavy implements, to reduce the tension on the top link. In either case, control spring 205 is deflected and control rod 210 is displaced forwardly. In such displacement abutment roller 215 on the control rod engages the projecting end 204 of the bell crank lever 184 and rocks that lever in a direction to permit the control valve to close under the action of its biasing spring. The implement continues to descend and the valve plunger to advance until the pressure of the fluid delivered to the power unit cylinder 31 is just sufficient to balance the vertical force of the implement and maintain the implement in position to develop the draft load selected by the positioning of the quadrant lever.

It will be appreciated that the draft load may be increased by swinging the lever 170 farther along its draft control range. Conversely, the draft load may be decreased by swinging a quadrant lever back toward the transport position. Return of the quadrant lever to the latter position results in the raising of the hitch linkage and attached implement to the near upper limit or transport position. This is marked by the crank arm 34 engaging the cover plate upon which it is mounted. As the hitch linkage reaches the transport position, the cam 178 passes beyond the range of the valve actuating lever 196, allowing the plunger 70 of the by-pass valve to snap over to the by-pass position. Accordingly, pressure fluid supplied by the pump 40 is diverted to the sump at relatively low pressure. Main control valve 57 in cooperation with check valve 59 block the exhaust from the power unit cylinder so that the hitch linkage and implement remain in the transport position.

When it is desired to operate the system in position control, quadrant lever 170 is swung toward the other end of its range, namely, rearwardly from the position in which it is shown in FIG. 11. As a result of this movement, the fulcrum of the position control bell crank lever 185 is shifted toward the valve assembly and conditioned for actuating the main control valve 57.

The initial movement of the quadrant lever from the transport position opens the main control valve to vent fluid from the power unit so that the hitch linkage and implement are permitted to descend. As the linkage descends, cam 224 on the lift shaft 35 rocks the bell crank lever clockwise and when the linkage reaches a point corresponding to that to which the quadrant lever has been moved, it positions valve plunger 75 so as to balance the pressure in the power unit cylinder against the weight imposed on the linkage by the implement. In other words, the hitch linkage is stopped in a place corresponding to the position in which the quadrant lever is set. Movement of the quadrant lever in either direction from that position operates the control valve for raising or lowering the hitch linkage to bring the linkage position into correspondence with the quadrant lever position.

Control of an auxiliary actuator is effected by swinging the quadrant lever through the limited range between the upper limit positions of the position control and draft control ranges. Since the by-pass valve 56 is normally opened when the implement is raised to transport position no fluid pressure is available for auxiliary actuator operation under normal conditions. When such an actuator is to be operated the hitch linkage is mechanically locked in transport position by rocking the stop pin 231 to the locking position shown in FIG. 12. Then by swinging the quadrant lever 170 to a position substantially centrally of its intermediate range, cam 180 is positioned to close the by-pass valve and again make pressure fluid available in the system. Pressure fluid is then delivered through the usual channels to the power unit actuator cylinder 31 and through the connecting conduit 236 to the auxiliary actuator. Delivery of fluid continues until the quadrant lever is returned to its transport position, opening the by-pass valve to unload the pump.

If the return of the quadrant lever is delayed the auxiliary actuator may end its stroke in which case pressure may build up in the system sufficiently to open the relief and unloading valve 49. That valve will be reset, however, for normal operation as an incident to the return of the quadrant lever to a transport position since the opening of the by-pass valve 56 will divert the fluid supply to exhaust and reduce the pressure in the system sufficiently to permit return of the unloading valve piston 138 to its normal unoperated position. Accordingly, pressure fluid will be available for normal control of the system in either automatic draft control or position control without necessitating the dropping of the hitch linkage and implement to the ground for resetting the unloading valve.

The constant by-passing or orificing of fluid through the main control valve during operation of the system introduces problems due to the resultant heating of the fluid. The present invention applies corrective measures automatically by diverting the exhaust fluid through a radiator or other cooler when temperature conditions require. On the other hand, when the temperature is low, fluid is automatically returned directly to the sump without passing through the cooler. This is particularly advantageous in cold weather starting as direct return of the fluid to the sump is maintained until the fluid warms up to an efficient operating temperature.

In general, it will be apparent from the foregoing that the invention provides a tractor hydraulic operating and control system of novel and advantageous character. The system is efficient and versatile, yet extremely simple in construction. The controls for the system are also simple and are characterized by the naturalness and smoothness of their operation.

We claim as our invention:

1. In a tractor having a hitch linkage pivoted to swing vertically through a working range to a transport position, a lift shaft journaled on the tractor and operatively connected to the hitch linkage, a hydraulically operated power unit operative to rock said shaft for raising and lowering the hitch linkage, a continuously running pressure fluid pump, valve means controlling the delivery of pressure fluid from said pump to and exhaust of fluid from said power unit, a by-pass valve interposed between said pump and said valve means operative when open to divert the fluid delivered by said pump to exhaust, and cam means rotatable with said shaft and operable independently of said valve means to hold said by-pass valve closed when the hitch linkage is in said working range.

2. In a tractor having a hitch linkage pivoted to swing vertically, a lift shaft journaled on the tractor and operatively connected to the hitch linkage, a hydraulically operated power unit operative to rock said shaft for raising and lowering the hitch linkage, a continuously running pressure fluid pump, valve means controlling the delivery of pressure fluid from said pump to and exhaust of fluid from said power unit, a by-pass valve interposed between said pump and said valve means operative when open to direct the fluid delivered by said pump to exhaust, and a cam rotatable in synchronism with said shaft and positioned to coact with said by-pass valve, said cam being shaped to permit the by-pass valve to open when the hitch linkage is raised to its upper limit position and to close the by-pass valve upon lowering of the hitch linkage from such limit position.

3. In a power operating system for a tractor implement hitch linkage, the combination of a hydraulic actuator mounted on the tractor and connected to the linkage for raising and lowering it, a continuously running pump supplying pressure fluid for the operation of said actuator, valve means carried by the tractor controlling the supply of pressure fluid to and exhaust of pressure fluid from said actuator, a by-pass valve interposed between said pump and said valve means operative when opened to direct the pump output to exhaust, draft load responsive control means for said valve means, position responsive control means for said valve means, a control shaft adapted to be rocked through position control and draft control ranges disposed at opposite sides of an intermediate range, means operable by said shaft when in said intermediate range acting to disable both said draft load responsive and said position responsive control means and being operative to condition said control means for operation respectively when said shaft is rocked to the draft control and positional control ranges, means operated in accordance with the position of the hitch linkage for opening said by-pass valve when said shaft is rocked to the limit of either control range adjacent one end of said intermediate range, and means carried by said shaft operative to close said by-pass valve as the shaft is rocked to a predetermined position within said intermediate range.

4. In a tractor having a vertically swingable implement hitch linkage, the combination of a hydraulic power unit mounted on the tractor and connected to the linkage for raising and lowering the same, a source of pressure fluid, valve means carried on the tractor controlling the supply of pressure fluid to and exhaust of fluid from the power unit, a by-pass valve effective when open to by-pass the pressure fluid supply to exhaust at relatively low pressure, means operated in accordance with the position of the hitch linkage for opening said by-pass valve when the linkage is raised to transport position and for closing it upon lowering of the linkage, draft load responsive control means for said valve means, position responsive control means for said valve means, a quadrant lever pivotally mounted on the tractor to swing through position control and automatic draft control ranges respectively located at opposite sides of an intermediate range, means operable by said quadrant lever when swung into either control range for conditioning the respective control means for actuating said controlling valve means with positioning of the quadrant lever at the upper limit of either control range initiating the raising of the linkage to transport position and the opening of said by-pass valve, and means operable by the quadrant lever when swung within said intermediate range for closing said by-pass valve.

5. In a tractor having a vertically swingable implement hitch linkage, the combination of a hydraulic power unit mounted on the tractor and connected to the linkage for raising and lowering the same, valve means carried on the tractor controlling the pressure fluid supply for said actuator, a by-pass valve effective when open to by-pass the pressure fluid supply to exhaust, means operated in accordance with the position of the hitch linkage for opening said by-pass valve when the linkage is raised to transport position and for closing it upon lowering of the linkage, draft load responsive control means for said valve means, position responsive control means for said valve means, a quadrant lever pivotally mounted on the tractor to swing through position control and automatic draft control ranges respectively located at opposite sides of an intermediate range, means operable by said quadrant lever when swung into either control range for conditioning the respective control means for actuating said controlling valve means with positioning of the quadrant lever at the upper limit of either control range initiating the raising of the linkage to transport position and the opening of said by-pass valve, and cam means rotatable by said quadrant lever operative to close said by-pass valve upon movement of the quadrant lever to a selected position in said intermediate range.

6. The combination in a tractor having an implement hitch linkage trailingly pivoted thereon and a hydraulically operated power unit for raising and lowering the hitch linkage, of a source of fluid under pressure, valve means carried by the tractor for controlling the supply of pressure fluid to the power unit to regulate its operation, a quadrant lever pivoted on the tractor to swing in opposite directions from either of two transport positions spaced apart within the range of travel of the lever, alternately available draft load and position responsive controls for said valve means, said draft responsive controls including a member shifted by said quadrant lever upon movement in one direction from the adjacent transport position into a position to actuate said valve means and operate said power unit for raising and lowering the hitch linkage to maintain a uniform draft load on the hitch linkage at a value determined by the extent of displacement of the lever from the transport position, said position responsive control means including a member shifted by said quadrant lever upon movement in the other direction from the other transport position into a position to actuate said valve means and operate said power unit for raising or lowering the hitch linkage in positional agreement with the setting of the quadrant lever, a by-pass valve operative to open and unload the pressure fluid source, means for opereating said by-pass valve when the hitch linkage is raised to transport position, and means operable by said quadrant lever when moved between said two transport positions for closing said by-pass valve to provide an available supply of pressure fluid in the system.

7. In a power operating system for a tractor implement hitch linkage, the combination of a hydraulic actuator mounted on the tractor and connected to the hitch linkage for raising and lowering it, a continuously running pump supplying pressure fluid for the operation of said actuator, valve means carried by the tractor controlling the delivery of pressure fluid to an exhaust of spent pressure fluid from said actuator, a by-pass valve interposed between said pump and said valve means operative when opened to divert the pump output to exhaust, draft load responsive control means for operating said valve means to position the hitch linkage for maintaining a selected draft load, control means operable manually to actuate said valve means for initiating the raising and lowering of the hitch linkage between transport and working positions and for selecting the draft load to be maintained by said draft load responsive means, and a cam rotatable in synchronism with raising and lowering of said hitch linkage and positioned to coact with said by-pass valve, said cam being shaped for opening said by-pass valve when the hitch linkage is raised to transport position and for closing the by-pass valve when the linkage is lowered from the transport position.

8. In a power operating system for a tractor implement hitch linkage, the combination of a hydraulic actuator mounted on the tractor and connected to the hitch linkage for raising and lowering it, a continuously running pump supplying pressure fluid for the operation of said actuator, valve means carried by the tractor controlling the delivery of pressure fluid to an exhaust of spent pressure fluid from said actuator, a by-pass valve interposed between said pump and said valve means operative when opened to divert the pump output to exhaust, a manually rotatable control shaft, control means movable in accordance with the position of the hitch linkage, said shaft and said control means cooperating to operate said valve means for raising or lowering the hitch linkage in positional agreement with the position of said control shaft, and a cam rotatable in synchronism with raising and lowering of said hitch linkage and positioned to coact with said by-pass valve, said cam being shaped for opening said by-pass valve when the linkage is raised to a transport position and for closing the by-pass valve when the linkage is lowered from the transport position.

9. In a tractor having an implement hitch linkage pivoted to swing vertically between a raised transport position and a lowered working position, a lift shaft journaled on the tractor and operatively connected to the hitch linkage, a hydraulic power unit operative to rock said shaft for raising and lowering the hitch linkage, a continuously running pressure fluid pump, valve means controlling the delivery of pressure fluid to an exhaust of spent pressure fluid from said power unit, a by-pass valve operative when open to divert the pressure fluid delivery by said pump to exhaust, means operable in the rotation of said lift shaft for opening said by-pass valve when the hitch linkage is raised to transport position and for closing the by-pass valve when the linkage is lowered from transport position, and means operable manually for closing said by-pass valve when the hitch linkage is in the transport position.

References Cited by the Examiner

UNITED STATES PATENTS

| | | | |
|---|---|---|---|
| 1,724,635 | 8/1929 | Bath | 60—52 |
| 2,192,778 | 3/1940 | Stacy | 60—97 |

(Other references on following page)

UNITED STATES PATENTS

| | | | |
|---|---|---|---|
| 2,245,080 | 6/1941 | Pendleton | 60—52 |
| 2,457,618 | 12/1948 | Wiesendanger | 236—345 |
| 2,459,613 | 1/1949 | Baker | 60—52 |
| 2,477,710 | 8/1949 | Worstell | 172—9 |
| 2,722,874 | 11/1955 | Bopf | 172—9 |
| 2,811,016 | 10/1957 | McRae | 60—52 |
| 2,822,737 | 2/1958 | Bunting | 172—9 |
| 2,837,285 | 6/1958 | Urban | 236—34.5 |
| 2,851,938 | 9/1958 | Giertz et al. | 60—52 |
| 2,852,918 | 9/1958 | Schwary | 60—52 |
| 2,921,638 | 1/1960 | DuShane | 172—9 |
| 2,940,530 | 6/1960 | DuShane | 172—7 |
| 2,946,392 | 7/1960 | Nelson | 172—7 |
| 2,952,245 | 9/1960 | Curlett et al. | 121—41 |
| 2,960,071 | 11/1960 | Rosebrook | 121—41 |
| 2,964,113 | 12/1960 | Presnell et al. | 172—9 |
| 3,014,536 | 12/1961 | Marindin et al. | 172—3 |
| 3,120,278 | 2/1964 | Ashfield et al. | 172—9 |
| 3,156,156 | 12/1964 | Peras | 60—52 |

FOREIGN PATENTS 1,210,941   10/1959   France.

ABRAHAM G. STONE, *Primary Examiner.*

THEODORE G. CRAVER, A. JOSEPH GOLDBERG,
*Examiners.*